United States Patent Office 2,772,984
Patented Dec. 4, 1956

2,772,984
PIGMENT

Bertram M. Helfaer, Hamburg, N. Y., assignor to Allied Chemical & Dye Corporation, New York, N. Y., a corporation of New York No Drawing. Application July 12, 1952,
Serial No. 298,624

7 Claims. (Cl. 106—289)

This invention relates to new and improved pigments.

Dry pigments are commonly manufactured by precipitation from aqueous solutions followed by filtration, washing, drying and grinding to fine powders. During the drying step the pigment particles tend to lose their ideal fine particle size by agglomerating to form hard cementitious masses. Such masses require costly and intensive grinding to reduce them to the fineness required for proper dispersibility in the vehicles to be colored. With some pigments produced in this manner it is difficult, if not impossible, to attain by grinding the desired pigment characteristics. Moreover, intensive grinding of the pigment to produce the necessary fine particle size may deleteriously affect the pigment.

A number of methods have been proposed for overcoming the above noted difficulties. One such method involves kneading the aqueous pigment paste with an organic vehicle, whereby the pigment "flushes" from the aqueous to the non-aqueous phase, which can then be separated and dried to remove the small amounts of water therein. The pigment-oil suspension thus obtained contains the pigment particles in a desirable condition similar to that in the aqueous paste.

According to another method the aqueous pigment is dried in the presence of added substances, which surround the pigment particles with a protective coating and thus preserve the fine particle size when the pigment is dried. Such additives, which are usually soluble in the vehicle in which the pigment is to be incorporated, include, for example, finely divided solid fatty acids and resins, water-insoluble rosinates, alkyl cellulose, naphthenic esters and amides.

Still another method comprises mixing the aqueous pigment with a relatively volatile, water-immiscible liquid, such as toluene, and removing the water together with the organic liquid by distillation.

The above noted methods may be deficient for a number of reasons, among which may be mentioned they are costly to carry out and/or they result in pigments of inferior quality.

It is an object of this invention to provide a pigment of improved tinctorial value, grinding properties and dispersibility.

Other objects and advantages of this invention will be apparent from the following detailed description thereof.

In accordance with this invention an activated silica gel having the physical properties hereinafter set forth, is admixed with the pigment prior to drying it and while the latter is in the desired finely divided state the resulting mixture dried and then ground to the desired particle size.

Surprisingly, it has been found that activated silica gels having the properties hereinafter set forth when admixed with the pigment prior to drying thereof prevent agglomeration of the pigment during drying and produce a dry pigment which is soft and friable and possesses improved dispersibility and tinctorial strength. Furthermore, the silica gel particles function to preserve the finely divided state of the pigment particles and thus result in a dry pigment which is substantially non-agglomerating.

As the silica gel admixed with the pigment before drying thereof in accordance with this invention, an activated silica gel is employed which has the following physical characteristics:

1. A surface area of at least 100, preferably from 180 to 900, square meters per gram.
2. Oil absorption of at least 100 and preferably from 150 to 180.
3. An average particle size of from 0.01 to 50 microns, preferably from 0.02 to 20 microns. The particles may be irregularly shaped and the measurement is specified for the maximum dimension.

The activated silica gel contains chemically bound water, the amount varying depending upon the process employed in producing and activating the silica gel. In general, the water content is within the range of from about 2% to about 10% by weight of the silica gel.

By an activated silica gel is meant a silica gel which is partially dehydrated under controlled conditions to produce a silica gel having the physical properties above enumerated. As procedures for effecting activation of silica gels are well known, it is believed further description thereof is unnecessary except to add that the activation procedure should be carried out to produce a silica gel product having the physical properties above noted.

A preferred activated silica gel which may be used in this invention, is the product sold under the trade name "Syloid 308" by the Davison Chemical Corporation which has a particle size averaging from 6 to 9 microns, an oil absorption value of about 170 and a surface area of about 180 to 350 square meters per gram. The activated silica gel product sold under the trade name "Hi-Sil" by the Pittsburgh Plate Glass Co. may also be used. This product has an average particle size of 0.025 micron, a moisture content of 4% to 7%, an oil absorption value of 160, a surface area within the range above noted, and the following analysis:

| | | |
|---|---|---|
| $SiO_2$ | percent | 86.5 |
| CaO | do | 3.0 |
| NaCl | percent max | 2.0 |
| $Fe_2O_3$ | do | 0.3 |
| $Al_2O_3$ | do | 0.3 |

The amount of activated silica gel admixed with the pigment will, of course, depend upon the specific organic color used and the desired properties in the finished pigment. In general from 1/20 to 20 parts by weight of activated silical gel is mixed with each part by weight of organic color. Preferably from 1/5 to 5 parts by weight of the activated silical gel is mixed with each part of organic color.

As suitable organic color constituents of the pigment, vat dyes, azo dyes, phthalocyanine dyes, lakes, toners, triphenylmethane dyes and any organic color which forms a dispersion of finely divided particles in a liquid medium may be used. The invention is particularly applicable to water-insoluble organic colors in the form of finely divided particles admixed with water, as, for example, the filter press cake or suspension of the color in the aqueous medium produced in the formation of the color by any known method. Thus, for example, azo, vat or other colors may be dissolved in sulfuric acid, and the solution drowned in water to precipitate the dyestuff. Alternatively, a vat dyestuff may be reduced in alkaline hydrosulfite solution and the soluble leuco compound oxidized to precipitate the vat dyestuff. An aqueous solution of salts or other substances may be combined to precipitate the water-insoluble color. Thus, a soluble azo dyestuff sulfonate may be reacted with a soluble barium salt to precipitate the insoluble color in a desired form.

The activated silica gel may be added to the above described aqueous media during, before or after the precipitation of the color. Preferably, but not necessarily, a small amount of a dispersing agent, such as a condensation product of formaldehyde and naphthalene sulfonic acid (Tamol N) may be incorporated in the admixture of activated silica gel and aqueous dispersion of the color or filter press cake thereof.

In lieu of an aqueous medium the activated silica gel and organic color may be mixed in a volatile organic solvent in which the organic color may be soluble and the resulting mixture evaporated to dryness to precipitate the organic color in a fine state of division in the presence of the activated silica gel.

While the mechanism for the improvement in results obtained by this invention is not fully understood, it is believed that the organic color particles react with the activated silica gel so that individual particles are held discrete from other particles. In other words, the activated silica gel functions to maintain the color particles in dispersed condition. In the absence of the activated silica gel the particles tend to form hard flintlike masses which decrease the tinctorial value of the pigment. Hence, employing activated silica gel in accordance with this invention, the particles remain dispersed and accordingly retain maximum tinctorial value. Furthermore, as no hard masses form, the pigments have improved dispersibility and grinding properties. It will be understood that this invention is not limited to the above thory or explanation of its effectiveness.

The pigments produced in accordance with this invention have been found particularly effective for coloring plastics, both opaque and especially transparent, such as cellulose acetate, cellulose nitrate, phenol formaldehyde resins, polyethylene resins, urea formaldehyde resins, polyamide resins, polyvinyl resins including vinylidene-chloride polymers, vinyl chloride polymers, mixtures of vinyl chloride and vinylidene-chloride polymers, and rubbers both natural and synthetic. It is also suitable for coloring printing inks, enamels, paints, lacquers, etc. Surprisingly and as illustrated in the examples hereinafter set forth, the pigments of this invention produce uniform coloration of transparent plastics and resins which are essentially equal in transparency to those obtained with colors consisting only of the organic dyestuff. The amount of pigment incorporated in the materials to be colored therewith may be varied and will depend on the specific organic color used and the desired properties of the finished colored materials.

The following examples are given for purposes of illustration only. It will be understood that the invention is not to be limited to these examples. In these examples all parts are by weight and unless otherwise indicated the activated silica gel used is "Syloid 308."

*Example I—Vat dye*

Activated silica gel was mixed with dimethoxy-dibenzanthrone (Carbanthrene Brilliant Green Paste, Color Index 1101) and sufficient water to produce a fluid paste which was then ground in a mortar. 5 parts of the activated silica gel were used per part of organic dye solids. The resultant mixture was evaporated to dryness in a steam bath and dried in an oven at 100° C. The dry lumps thus obtained were soft and easily broken and ground in a mortar to a fine powder. The resultant pigment was readily dispersed and produced strong green colorations in lacquers and varnishes containing natural or synthetic resins, for example, urea formaldehyde resins.

A comparative dyestuff paste produced in the same manner, but without the incorporation of the activated silica gel, on drying, resulted in a hard product which was much more difficult to grind in a mortar. The resultant dye gave specky and weak colorations when incorporated in the same resins, lacquers and varnishes.

The substitution of 5,5'-dichloro-6,6'-dimethyl-2,2'-bis-thionaphthen-indigo (Vat Red Violet RH Paste, Color Index 1212) for the Carbanthrene Brilliant Green Paste resulted in a red violet pigment of improved grinding properties, dispersibility and tinctorial value. Likewise the substitution of monochloro-N-dihydro-1,2,1',2'-anthraquinone azine (Carbanthrene Blue GCD Paste, Color Index 1112) for the Carbanthrene Brilliant Green Paste resulted in a blue pigment of improved grinding properties, dispersibility and tinctorial value.

*Example II—Vat dye*

10 parts monochloro-N-dihydro-1,2,1',2'-anthraquinone azine (Carbanthrene Blue GCD Paste, Color Index 1112) containing 2.5 parts of organic dye solids were vatted by heating with 16 parts of sodium carbonate, 11 parts of sodium hydrosulfite and 200 parts of water to 50° to 60° C. for 10 minutes. 10 parts of activated silica gel were added to the resulting solution of leuco compound which was then stirred for one hour at 50° to 60° C., cooled and mixed with sufficient hydrogen peroxide to oxidize the leuco compound and precipitate the vat dyestuff. The mixture was filtered and the filter cake was washed with water and dried at 100° to 110° C. The dry product was readily ground in a mortar to a fine powder, was readily dispersible and possessed high tinctorial value.

*Example III—Azo dye*

28 parts of the monoazodyestuff from diazotized xylidine coupled with β-naphthol, as filter cake containing 10 parts of organic dye solids, and 18 parts of water were mixed and ground in a mortar with 10 parts of activated silica gel. The resultant moist powder was dried in an oven at 50° to 60° C. The dry product was soft and friable and yielded a fine powder when lightly ground in a mortar.

The pigment was readily milled into phenol formaldehyde resins and the molded products obtained therefrom had excellent color intensity and uniformity. It was essentially equal in tinctorial strength (based on equal organic color content) to the same color powder which was obtained by drying the aforesaid filter cake without addition of activated silica gel and subjecting the "hard" dry product to intensive grinding.

*Example IV—Azo dye and toner*

91 parts of a monoazo dye made from diazotized 2-chloro-4-nitroaniline coupled with β-naphthol, as filter cake containing 20 parts of color solids, were mixed with 10 parts of activated silica gel in a mortar. This mixture was dried at 50° C. Other mixtures were produced in the same manner using respectively 2 and 5 parts of activated silica gel, instead of the 10 parts.

In every case "soft" dry products resulted from the drying of the mixtures. These products were readily ground to produce the pigment. These pigments when incorporated in varnishes possessed greater tinctorial strength (based on equal organic color content) than the pigments obtained by grinding the filter cake dried in the absence of activated silica gel.

*Example V—Phthalocyanine dye*

Approximately 10 parts of copper phthalocyanine (Solastral Blue Paste) were mixed with approximately 40 parts of activated silica gel and sufficient water to form a fluid paste. The resultant mixture was ground in a mortar and then evaporated to dryness at 100° to 110° C. A "soft" product resulted which was readily ground to produce pigments of improved dispersibility and tinctorial value.

For purposes of comparison a like pigment was made in the same manner by drying the Solastral Blue Paste but in the absence of the activated silica gel. Compared with this pigment the pigment of this invention was much more friable, was much more readily ground and the resulting powder when milled into a phenol formaldehyde resin was of much superior uniformity and tinctorial strength on the basis of incorporating equal amounts of organic color in the resin.

*Example VI—Triphenylmethane dye*

The hydrochloride of pentamethyltriamino triphenylcarbinol anhydride (Methyl Violet, Color Index 680) dissolved in water was run into an alumina paste. Tannic acid solution was then added with agitation followed by an aqueous solution of tartar emetic and aqueous aluminum sulfate. The precipitated lake was filtered and the resultant press cake containing 100 parts of organic color was mixed with 100 parts of activated silica gel (Hi-Sil), ground and then dried. The dry product was "soft" and friable and yielded a fine power when ground. The resulting pigment was of improved dispersibility and tinctorial strength.

*Example VII—Lake*

The alumina lake of 1,2-dihydroxyanthraquinone (Alizarin, Color Index 1027) prepared in a usual manner was filtered, washed and to the press cake thus isolated was added activated silica gel (Hi-Sil) employing approximately equal amounts of the silica gel and the organic color. The resultant mixture was stirred until uniform, and dried and finely ground to produce the pigment. An orange pigment was thus obtained of improved dispersibility and tinctorial value.

As demonstrating the improved dispersibility and other desirable characteristics of the pigments of this invention attention is called to the following:

A. Green pigments produced in accordance with Example I above and containing 5, 10 and 20 parts of activated silica gel per part of organic color were incorporated in a polystyrene resin and the colored polystyrene injection molded at 320° F. Bright green transparent plaques of excellent uniformity of coloration and tinctorial strength were obtained. Repetition of this test employing, however, a control pigment, which was the same as that of Example I but without the activated silica gel, resulted in the production of polystyrene plaques of specky and very much weaker coloration.

B. Pigments prepared in accordance with Example I and containing 5, 10 and 20 parts of activated silica gel per part of organic color were incorporated in cellulose acetate and the colored cellulose acetate was injection molded at 350° to 380° F. Bright green transparent plaques of excellent uniformity and tinctorial strength were obtained. Repetition of this experiment using a pigment the same as in Example I but not containing the activated silica gel resulted in cellulose acetate plaques of specky and appreciably weaker coloration.

It will be noted that this invention provides pigments of improved tinctorial value, grinding properties and dispersibility.

It is intended that all matter contained in the above description shall be interpreted as illustrative and not in a limiting sense.

What is claimed is:

1. Pigments of improved dispersibility and tinctorial value comprising a water-insoluble organic color in finely divided form admixed with an activated silica gel having a surface area of at least 100 square meters per gram, an oil absorption value of at least 100, and an average particle size of from 0.01 to 50 microns, said silica gel being present in amount of from $\frac{1}{20}$ to 20 parts by weight per part by weight of organic color.

2. Pigments of improved dispersibility and tinctorial value comprising a vat dye in finely divided form admixed with an activated silica gel having a surface area of at least 100 square meters per gram, an oil absorption value of at least 100, and an average particle size of from 0.01 to 50 microns, said silica gel being present in amount of from $\frac{1}{5}$ to 5 parts by weight per part by weight of organic color.

3. Pigments of improved dispersibility and tinctorial value comprising a water-insoluble azo dye in finely divided form admixed with an activated silica gel having a surface area of at least 100 square meters per gram, an oil absorption value of at least 100, and an average particle size of from 0.01 to 50 microns, said silica gel being present in amount of from $\frac{1}{5}$ to 5 parts by weight per part by weight of organic color.

4. Pigments of improved dispersibility and tinctorial value comprising a water-insoluble phthalocyanine color in finely divided form admixed with an activated silica gel having a surface area of at least 100 square meters per gram, an oil absorption value of at least 100, and an average particle size of from 0.01 to 50 microns, said silica gel being present in amount of from $\frac{1}{5}$ to 5 parts by weight per part by weight of organic color.

5. Pigments of improved dispersibility and tinctorial value comprising a water-insoluble triphenylmethane color in finely divided form admixed with an activated silica gel having a surface area of at least 100 square meters per gram, an oil absorption value of at least 100, and an average particle size of from 0.01 to 50 microns, said silica gel being present in amount of from $\frac{1}{5}$ to 5 parts by weight per part by weight of organic color.

6. Pigments of improved dispersibility and tinctorial value obtained by drying a wet mixture comprising a water-insoluble organic color in finely divided form and an activated silica gel having a surface area of at least 100 square meters per gram, an oil absorption value of at least 100, and an average particle size of from 0.01 to 50 microns, said silica gel being present in amount of from $\frac{1}{20}$ to 20 parts by weight per part by weight of said organic color.

7. Pigments of improved dispersibility and tinctorial value obtained by drying an aqueous medium containing a mixture comprising a water-insoluble organic color in finely divided form and an activated silica gel having a surface area of at least 100 square meters per gram, an oil absorption value of at least 100, and an average particle size of from 0.01 to 50 microns, said silica gel being present in amount of from $\frac{1}{5}$ to 5 parts by weight per part by weight of said organic color.

References Cited in the file of this patent

UNITED STATES PATENTS

| Number | Name | Date |
|---|---|---|
| 1,539,342 | Williams | May 26, 1925 |
| 1,944,294 | Maynard | Jan. 23, 1934 |
| 1,978,197 | Hailwood et al. | Oct. 23, 1934 |
| 2,492,959 | Blumenthal | Jan. 3, 1950 |